Jan. 21, 1958   R. O. AARVOLD   2,820,515
HOLD HATCHES OPERATED WITH THE AID OF A PRESSURE MEDIUM
Filed Oct. 22, 1954
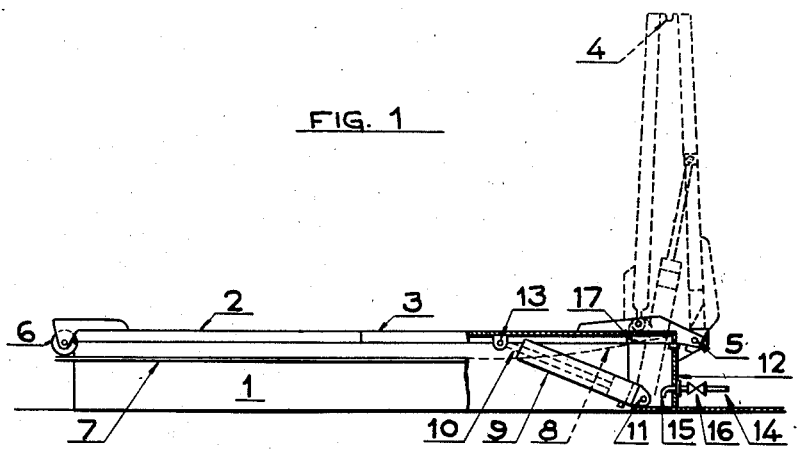
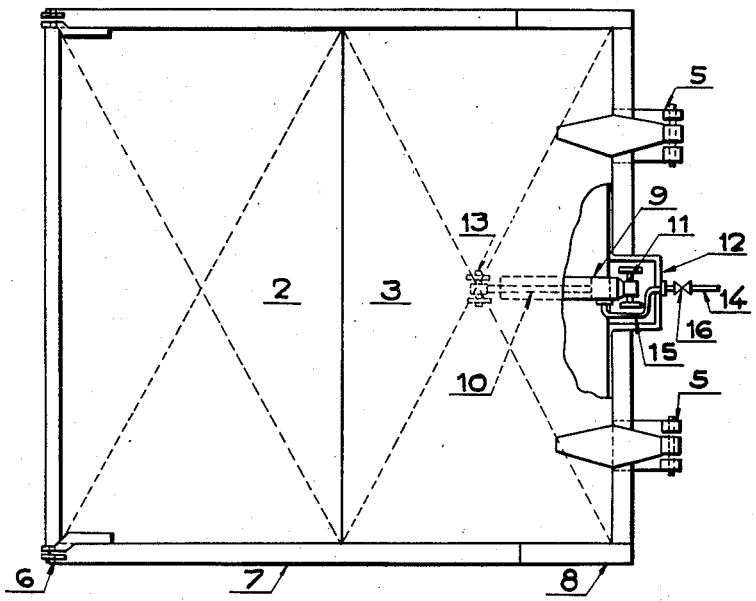

2,820,515

HOLD HATCHES OPERATED WITH THE AID OF A PRESSURE MEDIUM

Reinhardt Olai Aarvold, Gothenburg, Sweden, assignor to Aktiebolaget Gotaverken, Gothenburg, Sweden, a corporation of Sweden Application October 22, 1954, Serial No. 464,030

Claims priority, application Sweden October 29, 1953

1 Claim. (Cl. 160—188)

The present invention refers to a hold hatch for ships, wherein the hatch cover, which may be made in one or more sections, is swingable about hinges located outside the hatch opening, said hatch cover being operated with the aid of a pressure medium. The invention is principally distinguished by the feature that an engine actuated by the pressure medium is pivotally secured to the hatch cover as well as to the portion of the deck paralleling the hinge side of the hatch, the latter point of attachment of the motor being located at the most so far inside the hinge axis that the engine, when the hatch cover is in its upwardly swung position, is located substantially outside the side of the hatch opening paralleling the pivot axis. With this location, the engine will, when the hatch is open, be located substantially in parallel to the raised section of the hatch, the engine then incurring the least risk in the loading and unloading of the ship. In a suitable form of embodiment, the engine is located within the frame of the hatch opening and is then during the passages of the ship entirely protected from the influence of the moist sea air and from breaking waves and the like.

The accompanying drawing illustrates an example of the invention as applied to a hold hatch of a large ship, said hatch consisting of two transverse sections.

Fig. 1 is a partly sectioned elevation of the hatch, and Fig. 2 also is a partly sectioned view of the hatch when viewed from above.

The hatch opening is surrounded in known manner by a coaming 1 and is covered by two hatch cover sections 2 and 3. These sections are united mutually by means of hinges 4, and one of the sections is connected to the coaming or the deck by means of hinges 5. The hinge axis is located so far outside the coaming that both sections can be folded together and raised into a vertical position so as to be brought outside the hatch opening, so that the latter becomes entirely accessible for loading and unloading. The other section is in known manner provided at the outer end thereof with wheels 6 running on a track 7 at the coaming, said track terminating in a curved gradient 8. This gradient makes it possible for the sections of the hatch to commence a closing movement from their raised position, as soon as the retaining force is removed.

For the operation of the hatch sections, a reciprocating engine 9 of a suitable construction and actuated by a pressure medium is made use of, said engine being here only indicated diagrammatically as a piston provided with a rod 10 and running in a cylinder. The cylinder is swingably secured about a pivot 11 arranged at the coaming of the hatch, and the piston rod is in a similar manner swingably secured to the hatch section by means of a pivot 13. The coaming extends for the substantial portion thereof as near the hatch opening as possible, and to secure a suitable location of the motor, an outwardly extending cavity 12 is porvided in the coaming, one end of the engine being secured in said recess. The pivot axis of the hatch is arranged athwartships in the conventional manner, for which reason an arrangement like this may be resorted to without appreciably influencing the fore-and-aft strength of the ship. The engine is supplied with a pressure medium from a conduit 14 over a hose 15 or some other flexible member, and the motion thereof is controlled in a suitable manner by means of a valve 16. The cavity is covered by a member 17 projecting from the hatch section, said member being like the sections provided with packings and means to tighten up the same.

When the engine is supplied with pressure medium, the piston is displaced outwardly, the hatch sections being thus swung upwardly about the hinges 5 so as to finally take the position shown by dash lines in Fig. 1. In this position the parts of the engine projecting above the coaming are enclosed between the hatch sections so as to be protected against damage in the loading and unloading of the ship.

The lower portion of the reciprocating engine is enclosed on three sides by the cavity, and the important feature of the invention resides in that the engine will in its upwardly swung position be substantially outside the border of the hatch opening, so as not to project into the opening to prevent the work in handling the load and so as not to be damaged itself thereby.

The details of the construction may obviously be varied in many ways within the scope of the appended claim. The controlling means are only indicated diagrammatically and will have to be dimensioned and formed with respect to the occurring loads and stresses. With broad hatches it might be found suitable to provide a plurality of cylinders working in parallel, and with hatch sections having a great extension in the fore-and-aft direction the attachment of the engine may be lowered down in the coaming underneath the plane of the deck, so that the engine will obtain a suitable inclination to the closed hatch for the development of the proper power at the moment of opening the hatch. The engines may also be arranged outside the longitudinally extending sides of the hatch coaming and are then adapted for an engagement with the outer sides of the hatch section. With this location, the engines will also take a position paralleling the raised section in the fully unfolded position, and will thus be substantially protected by said section during the loading and unloading work on board.

What is claimed is:

In a ship having a deck with a hatch opening therein, a coaming surrounding said hatch opening, and a sectional hatch cover adapted to rest on said coaming, a first section of said cover being pivotally connected to spaced hinges mounted on the outer surface of one side of said coaming and a second section of said cover being pivotally connected to said first section; a control apparatus for said hatch cover comprising a fluid pressure operated jack arranged within said coaming and extending over a substantial part of said hatch opening when the cover is positioned on said coaming, said jack being pivotally connected at one end to the center of the under side of said first cover section and at the other end to a pivot located in a centrally-located recess in said coaming intermediate said spaced hinges and lower than said hinges, said jack connections being such that when said jack is actuated to remove said cover from said hatch opening the upper end of said jack will be positioned between the first and second sections in their folded positions and the lower end of said jack will be positioned within said coaming recess unobstructedly free from said hatch opening.

References Cited in the file of this patent

UNITED STATES PATENTS

| | | |
|---|---|---|
| 2,113,291 | Clark et al. | Apr. 5, 1938 |
| 2,322,372 | Levy | June 22, 1943 |
| 2,491,261 | Greer et al. | Dec. 13, 1949 |
| 2,640,454 | Kummerman | June 2, 1953 |

FOREIGN PATENTS

| | | |
|---|---|---|
| 971,979 | France | May 14, 1952 |
| | (1st Addition 55,607) | |
| 1,040,958 | France | May 27, 1953 |